Figures 1, 2:
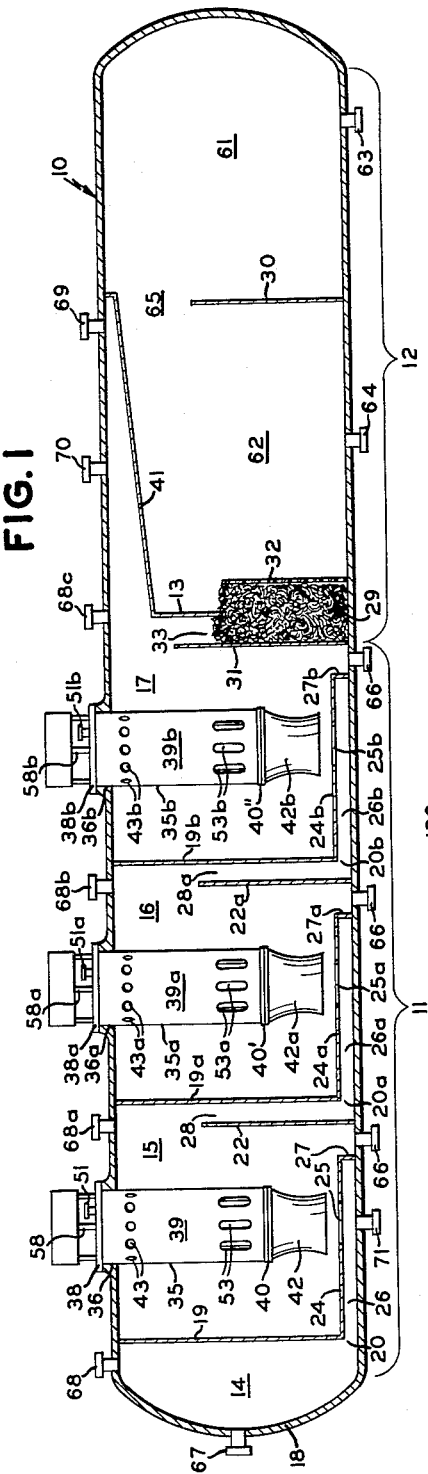

Dec. 8, 1964    J. M. BLACK ETAL    3,160,673
HYDROCARBON ALKYLATION PROCESS
Filed Feb. 19, 1960

INVENTORS
JOHN M. BLACK
JAMES WARBURTON
SAMUEL R. STILES
BY G. H. Palmer
ATTORNEY
M. J. Mauer
AGENT 3,160,673
Patented Dec. 8, 1964

3,160,673
HYDROCARBON ALKYLATION PROCESS
John M. Black, Plandome, N.Y., James Warburton, Alamo, Calif., and Samuel R. Stiles, Cresskill, N.J., assignors, by mesne assignments, to Pullman Incorporated, a corporation of Delaware
Filed Feb. 19, 1960, Ser. No. 9,843
31 Claims. (Cl. 260—683.59)

This invention relates to a process for carrying out liquid phase reactions with a liquid catalyst. In one aspect this invention relates to a process for carrying out liquid phase reactions with a liquid catalyst which is immiscible with at least one of the reactants. More particularly, the invention relates to a process for carrying out liquid phase reactions of hydrocarbons in the presence of an acid catalyst in a multi-zone reactor. Still more particularly, the invention relates to a process for carrying out liquid phase alkylation of hydrocarbons in the presence of an acid catalyst and in a plurality of reaction zones.

This application is a continuation-in-part of application Serial No. 387,118, filed October 20, 1953, now U.S. Patent No. 2,927,009.

In carrying out liquid phase reactions in the presence of a liquid catalyst which is immiscible with at least one of the reactants, it is necessary to secure intimate mixing of the catalyst and the reactant to thereby form and maintain an emulsion in which either the reactant or the catalyst constitutes the continuous phase. In the alkylation of hydrocarbons, which will be referred to as illustrative of the reactions to which the present invention is applicable, it is necessary to effect intimate mixing of the hydrocarbon reactants and the acid catalyst to obtain the benefits of the catalytic action of the acid catalyst; the degree of mixing of the hydrocarbons and acid is an important factor in determining the rate of conversion and the overall efficiency of the operation.

In the alkylation of isoparaffin hydrocarbons with olefin hydrocarbons in the presence of sulfuric acid, referring to the alkylation of isobutane with butenes and/or propylenes as an example, the olefin hydrocarbons react with the sulfuric acid while the isoparaffin hydrocarbons present remain in a separated phase as droplets. The alkylation reaction takes place at the surface of the droplets forming the discontinuous phase of the emulsion. The degree of mixing of the emulsion and the resulting dispersion of isobutane droplets in the acid phase of the emulsion have an important effect on the amount of conversion of reactants occurring at the surface of the isobutane droplets. Such a process is operated with a view to forming and maintaining a proper body of emulsion so as to assure high overall efficiency.

Carrying out the alkylation reaction, a plurality of series arranged, communicating reaction zones within a reactor is preferred over the single zone reactor. In the multi-zone type of reactor, the acid and the bulk of the isobutane are introduced for series flow through the zones wherein these components are emulsified by mixing means in each zone. The olefin feed is supplied in parallel streams to the respective reaction zones and to the emulsion. The emulsion and the discontinuous phase remain in the first zone of the series until a predetermined liquid level, established by a liquid overflow means, is reached. The overflow from the first reaction zone then spills over to the next reaction zone, wherein a repetition of the above reaction and flow pattern occurs, and this procedure is repeated in each reaction zone of the reactor until liquid leaves the final reaction zone. From the last reaction zone the product overflow passes to the hydrocarbon-acid separation section wherein these phases are separated, as for example, by settling. However, this method of effecting the flow of liquids through the various reaction zones is not altogether satisfactory since the method frequently results in flooding the reaction zones. When this occurs, the liquid and the vapors intermix and cause vapor locking in the mixer. These, and other disadvantages have greatly increased the cost of operating in this manner.

Concurrently with the alkylation reaction, there is a condensation reaction of the olefin hydrocarbons in the sulfuric acid which may be termed "hydrosulfation." The condensation products of this reaction are undesirable as they reduce the yield of desired alkylate products, accumulate in the acid phase and in the emulsion, and impair the catalytic activity of the acid. The "hydrosulfation" reaction rate increases with the concentration of the olefin hydrocarbon reactants, the reaction temperaure and the duration of intervals between the incidents of contact between the emulsion and the olefin. Since the alkylation reaction is to some extent reversible in the presence of acid catalyst, the alkylate product can decompose to produce olefin, and a portion of this olefin fails to reproduce alkylate product because of the completing "hydrosulfation" reaction with acid in the reaction zone. Therefore, it is highly desirable to reduce to a minimum, the time intervals between olefin contact in order to decrease the formation of undesirable by-products.

Also, to improve the efficiency, both with regard to the alkylate product and the sulfuric acid employed, the alkylation reaction is usually carried out at comparatively low temperatures and at low concentrations of olefin hydrocarbons reactants. Thus, it is important to maintain in the reaction zone a relatively high concentration of isobutane and as high a ratio of isobutane to olefin as is practicable. To this end, an isobutane to olefin feed rate ratio of about 6 to 10:1 is commonly employed, although a higher isoparaffin excess is desirable in the reaction zone.

It has been found in accordance with the present invention, that the reaction between the isoparaffin hydrocarbons and the olefin hydrocarbons is driven preponderantly in the direction of the alkylate product and the formation of undesirable by-products, due to the "hydrosulfation" reaction, is reduced to a minimum when a high isoparaffin-olefin ratio is maintained in the region of introduction and intermixing of the olefin hydrocarbon into the isoparaffin hydrocarbon-acid emulsion. Heretofore, it has been necessary to introduce and circulate abnormally large volumes of isoparaffin and acid in the proper proportion through the reactor to accomplish this result. In addition to the proportionately low yields of alkylate per cc. of olefin feed obtained by employing this technique, it has been found that acid consumption increases to such an extent, economics mitigate against increasing the volume of feed to obtain ratios in a more favorable range.

It has been found in accordance with the present invention, that alkylation reactions carried out under conditions which include adiabatic operation or temperatures which, although controlled to some degree, nevertheless fluctuate over a relatively wide range, do not result in high yields of high quality alkylate. The alkylation reaction between an alkylatable hydrocarbon and an olefin is carried out in the liquid phase at as high a temperature as liquid phase conditions will permit so as to maintain a reasonable rate of reaction. However, the alkylation reaction is exothermic and, therefore, when alkylation is effected quantities of heat are given off to raise the temperature of the reaction mixture. This effect is greatly magnified when alkylation is carried out in a series of reaction zones with continuous flow of the reactant mixture through the zones. It is known that as the alkylation temperature increases, the formation of polymers which degrade the alkylate product rises to a maximum. Therefore, a method of controlling temperature or removing heat from the exothermic alkylation reaction in such a manner that a favorable rate of reaction is maintained is highly desirable.

Prior art methods have applied refrigerative cooling subsequent to the alkylation reaction in an attempt to provide some measure of temperature control. This is accomplished by providing an alternate series of reaction and cooling zones. However, this method permits the temperature at the point of reactant contact, viz., the point of olefin introduction, to rise abruptly upon the spontaneous reaction of isoparaffin and olefin. This condition is extremely detrimental to the alkylation reaction since it is at this point that a portion of the olefin reactant undergoes hydrosulfation and the amount of olefin which enters into this side reaction, increases with the temperature. Therefore, prior art methods of refrigerative cooling, do not present a satisfactory solution to the problem of temperature control.

To reduce the residence time of reactants in a particular zone, pressured feed streams have been recommended to force the volume of liquid through the reaction zones at a faster rate. However, this method has been found to be impractical since flooding of the zones results and the cost of the resulting high circulation rates is prohibitive.

It is, therefore, an object of the present invention to provide an alkylation process which results in the maximum production of high quality alkylate.

Another object of this invention is to provide a process for the alkylation of an alkylatable hydrocarbon and an olefin with the minimum formation of sulfate by-products.

Another object of this invention is to provide a process for reacting an alkylatable hydrocarbon with an olefin in a plurality of reaction zones wherein the time intervals between alkylatable hydrocarbon contact with olefin is reduced to a minimum.

Another object of this invention is to provide an alkylation process having improved pressure control.

Another object of this invention is to provide a method for obtaining a more favorable mole ratio of reactants at the point of reactant control.

Another object of this invention is to provide an improved method of passing liquid reactants from one reaction zone to another.

Another object of this invention is to provide a method for carrying out multi-zone alkylation reactions in the absence of flooding in the zone and resistance offered by the specific gravity differences of liquids.

Still another object of this invention is to provide a process for effecting liquid phase alkylation of isoparaffin hydrocarbons with olefin hydrocarbons in the presence of an acid catalyst in which the acid catalyst and the isoparaffin hydrocarbon reactants are progressed in series flow through a plurality of reaction zones, while the olefin hydrocarbon reactants are supplied in parallel flow to the plurality of reaction zones to be intimately intermixed thereat, substantially as supplied, with the isoparaffin hydrocarbon and the acid catalyst flowing through the respective reaction zones, the series flow of the isoparaffin hydrocarbon and the acid catalyst being from the bottom to the top of a respective zone and from thence to the bottom of the next zone, the mixing means being located at the bottom of each of said zones so that no material can pass through any one of said zones without passing through the respective mixing means and traversing the full length of said zones; said mixing means furthermore inducing a sufficiently high flow rate in the region of olefin hydrocarbon introduction to establish thereat a desired high isoparaffin hydrocarbon-olefin hydrocarbon ratio.

Still another object of this invention is to provide a process for effecting liquid phase alkylation of isoparaffin hydrocarbons in which the acid catalyst and the isoparaffin hydrocarbon reactants are progressed in series flow through a plurality of mixing and reaction zones, while the olefin hydrocarbon is supplied in parallel flow to each of said zones; said mixing zones being separate and maintained at pressures sufficient for evaporation of hydrocarbon supplied to the feed for auto-refrigeration of said reaction zones, said pressures being adjusted and controlled to promote the flow of the materials through said separate zones.

According to the process of this invention, an alkylatable hydrocarbon is reacted in the liquid phase with an olefin in a plurality of reaction zones within a reactor under controlled pressure conditions such that a progressively lower pressure is maintained in each succeeding zone in the direction of liquid flow through the reactor. The reaction is preferably carried out under substantially isothermal conditions by vaporizing low boiling hydrocarbons and removing at least a portion of the vapors to dispel the sensible heat of reaction given off at the point of olefin introduction into an alkylatable hydrocarbon-acid emulsion. The vapors produced in a given zone are confined therein and a controlled amount of vapor from each of the reaction zones is withdrawn to maintain substantially a constant pressure in each reaction zone and establish decreasing pressure along the flow path of the reactant mixture passing through each of the succeeding reaction zones in the reactor. Thus, the flow of the reaction mixture, which is induced by the relative pressure differential between zones, is conducted through the zones in series at a high rate of circulation and in the absence of the occurrence of flooding within the zones. This result is accomplished with a relatively low reactant feed rate to the reactor.

Also, by the present process, the sensible heat of the exothermic reaction can be removed during the reaction, or as soon as it is generated by spontaneous vaporization to provide improved temperature control as under isothermal conditions in the reaction zone or in the entire reactor, if desired.

The alkylatable hydrocarbons which are referred to in the process of the present invention are aromatic compounds, such as, for example benzene and toluene, and aliphatic compounds. Among the specific aliphatic compounds contemplated within the scope of this invention are isobutane, isopentane, etc. The olefin reactants included in the scope of this invention comprise ethylene, propylene, butylene, etc., and isomers thereof.

The temperature and pressure at which the overall alkylation reactions are carried out is within the range of between about 5° F. and about 150° F. and from about 0 p.s.i.g. to about 100 p.s.i.g. for aliphatic alkylations and somewhat higher for aromatic alkylations. For example, in the alkylation of benzene with propylene, a temperature of between about 350° F. and about 480° F. under from about 500 p.s.i.g. to about 700 p.s.i.g. is generally employed. As stated above, to maintain a high reaction rate, the alkylation temperature for a given system is preferably at a temperature as high as liquid phase reacting conditions will permit. For convenience, the following Table I recites the boiling points at atmospheric pressure of various components which may be present in the reaction mixture.

TABLE I

*Boiling Points of Reaction Components at Atmospheric Pressure*

| Component | °C.* | °F. |
|---|---|---|
| Propane | −44.5 | −47.2 |
| Isobutane | −10.2 | 14.0 |
| n-Butane | −0.55 | 31.0 |
| Isopentane | 28.0 | 82.4 |
| Pentane | 36.2 | 96.8 |
| Neopentane | 9.5 | 13.5 |
| Ethylene | −103.8 | −152.5 |
| Propylene | −47.0 | −52.0 |
| α-Butylene | −6.3 | 21.0 |
| β-Butylene | 1.4 | 34.0 |
| Isobutylene | −6.9 | 21.2 |
| α-Amylene | 30.1 | 86.0 |
| Toluene | 110.6 | 230.7 |
| Benzene | 80.1 | 176.0 |

* Organic Chemistry, R. Q. Brewster, Second Edition May 1953.

The alkylatable hydrocarbon at the point of contact with olefin is always in excess and preferably in a mole excess of at least 200, although higher mole ratios of alkylatable hydrocarbon to olefin, in the order of about 400:1 or higher, are most preferred.

The high molar excess of alkylatable hydrocarbon is maintained at the point of olefin introduction in various ways in accordance with the present invention. For examle, the circulation rate of isoparaffin past the point of olefin introduction can be increased to such an extent that the mole ratio in the respective feeds is multiplied by a factor of about 4. However, this method does not supply an excess of isoparaffin within the above preferred range, namely, a molar excess in the order of between about 200:1 and about 400:1 or higher. Also, the requirement load on the impeller necessary to provide an isoparaffin excess within this range is unfavorable from an economic viewpoint. Thus, the method of maintaining a higher molar excess of isoparaffin by the process of the present invention is to employ an impeller mixing device which, after passage of the alkylatable hydrocarbon past the point of olefin introduction, provides means for recirculating at a high velocity the unreacted mixture to the mouth of the mixer for recirculation therethrough.

The mixing means employed in the reaction zones are preferably enclosed by a hollow shell and have greater capacity than required to handle the acid and reactants supplied to the respective zones so that recirculation of materials in the respective zones takes place. Since the zones contain materials of different densities, stratification can and does take place. When positive mixing and turbulence is discontinued the semi-quiescence required for stratification is provided, preferably by allowing the reaction mixture, after olefin introduction to rise in elongated product take-off tubes located within the hollow mixer shell. The vapor, which then forms an upper layer within the shell is dispelled from the upper portion thereof, while the liquid is allowed to overflow the tubes and is expelled from a lower portion of the mixer shell. Of course, it is to be understood that other means of accomplishing stratification may be employed, if desired; for example, coalescing induced by a demister pad, etc.

Provision is made for retaining the lighter material in the upper portion of the reaction zone away from the inlet of the mixing means so that the body of liquid, which represents the heavier material in each zone, is superimposed by a body of vapor. Also, since the upper end of the zones are closed with respect to one another, lighter gaseous materials can only flow from any one zone to the product separation section of the reactor and not to the succeeding mixing means or reaction zones of the reactor. The amount of vapor removed from each zone, by vapor take-off means, is regulated to provide a pressure drop preferably of at least 1 p.s.i. between one zone and the next succeeding zone, although the pressure drop between adjacent zones within the reactor need not be uniform.

In regard to the contacting of isoparaffin with olefin, it is also advantageous to circulate isoparaffin-acid emulsion past the point of olefin introduction at a rate of between about 8000 gal./min. and about 15,000 gal./min. Since the acid catalyzes the alkylation reaction, it serves to best advantage in the form of tiny droplets in the alkylatable hydrocarbon phase and, when a uniform distribution of acid in alkylatable hydrocarbon is maintained, the side reaction of "hydrosulfation" is greatly reduced.

In general, the present process comprises supplying olefin in a plurality of separate parallel streams to a plurality of reaction zones, supplying catalyst and alkylatable hydrocarbon in the form of alkylatable hydrocarbon-acid catalyst emulsion, to the first reaction zone for series flow through each of the succeeding zones, passing the emulsion upwardly in a mixing device enclosed by a hollow mixer shell past the point of olefin introduction whereupon a portion of the mixture is spontaneously vaporized as a result of the exothermic reaction, removing sensible heat of reaction by withdrawing vapors from the hollow shell and a controlled amount of vapor from the reaction zone to maintain a predetermined pressure, preferably a constant pressure therein, while recirculating at least a portion of the liquid reaction mixture to the mouth of the mixer for recontact with olefin, maintaining the liquid in said zone at a predetermined level by inducing the flow of liquid by suction over a liquid level establishing means, into a take-off conduit which terminates at the bottom of the next succeeding zone maintained at a lower pressure than the previous zone from which the liquid is being expelled and repeating the above procedure in each of the succeeding reaction zones.

As explained above, the pressures in each of the plurality of reaction zones decreases in the direction of flow of the reaction mixture, thus inducing the flow of reaction mixture from zone to zone, in series at a high rate. The pressure drop from one zone to the next is between about 0.5 p.s.i. and about 10 p.s.i., and preferably between about 1 p.s.i. and about 3 p.s.i. In the alkylation of an isobutene with an olefin, the pressure drop between zones is most preferably maintained at between about 1.4 p.s.i. and about 2.6 p.s.i.

According to this invention, a relationship was observed which enables the pressure differential between any two zones to be determined in any multi-zone liquid phase operation wherein the reaction zones are arranged side by side as in a horizontal reactor or one on top of the other as in a vertical reactor. The following formula was developed for the purposes of the present invention.

$$P_1 = P_2 + \frac{(d_e(h_e) - d_f(h_f))}{2.31} + F$$

wherein $P_1$ is the pressure in a reaction zone expressed in pounds per square inch; $P_2$ is the pressure in the next succeeding reaction zone; $d_e$ is the average specific gravity of the emulsion in reaction zone of $P_2$ pressure; $h_e$ is the liquid level, in feet, of the liquid in reaction zone of $P_2$ pressure; $d_f$ is the specific gravity of the liquid flowing from reaction zone of $P_1$ pressure to the reaction zone of $P_2$ pressure; $h_f$ is the liquid level, in feet, of the liquid being transported into the zone of $P_2$ pressure and $F$ is the frictional loss during transportation expressed as pounds per square inch. Specifically, in a cascade reactor, for example, the cascade reactor shown in the accompanying drawing, $h_f$ is the liquid level in the passageway connecting the reaction zones, e.g. passageway 28. On the other hand, in a vertical reactor, where the reaction zones are superimposed on one another, $h_f$ the difference between $h_f$ and $h_e$ would be the height, in feet, that liquid $d_f$ must flow to reach liquid $d_e$.

In deriving the above formula, it has been observed that liquid just after being expelled from the mixer has a high density because of its emulsification with acid;

therefore, the liquid in the lower portion of the reaction zones is of high density. However, as the liquid level rises in the reaction zone, the density of the liquid above the liquid exit ports in the mixer has a lower density due to partial disintegration of the emulsion and, therefore, the liquid overflowing the level establishing means is at a lower density than the liquid in the bottom of the zone to which it is being conducted.

By carrying out alkylation according to the above process, the residence time of the reaction mixture in a given reaction zone is markedly reduced, conditions in a reaction zone are maintained at a constant temperature so that the reaction in the zone can be conducted under completely isothermal conditions, and the isothermal operation can be extended over the entire alkylation reactor, if desired, by regulating the amount of vapor removed in each zone.

For optimum efficiency of the above process, it is also advantageous to introduce alkylatable hydrocarbon and acid catalyst to an admission chamber prior to entry into the first reaction zone. In the admission zone certain low boiling components of the alkylation feed, for example, methane and ethane, when present therein, are vaporized and removed immediately from the reactant mixture. Since these low boiling materials, if present, may cause difficulties in later stages of the alkylation reaction, such as, for example, causing vapor-locking in the mixer and in the conduits connecting the reactions, they are preferably removed prior to reaction in the admission zone. This vapor and the remaining vapor, which is formed by the exothermic reaction and which is withdrawn from the various reaction zones as a means of pressure and/or temperature control, is preferably reintroduced into the reactor in the product separation section, after which the vapors are withdrawn, cooled, concentrated in higher boiling components, and the higher boiling components returned to the reactor in the feed thereto.

The invention will be particularly described with reference to the accompanying drawing which illustrates the process by reference to embodiments of a preferred apparatus in which the invention is carried out. It is to be understood, however, the invention is not limited by reference to the specific modifications illustrated by the drawing, but is capable of other modification within the scope of the invention.

In the drawing,

FIGURE 1 is a side view illustrating a suitable apparatus in which the process of the invention is carried out; and FIGURE 2 is a diagrammatic view of the process steps in apparatus set up for carrying out the novel process of the invention.

Referring to FIGURE 1, the reactor 10 may be of any convenient shape and size but is preferably in the form of a closed ended cylindrical or approximately cylindrical tank as shown. The reactor 10 is divided by means of a baffle or deflector plate 13 and partition 31 into a reaction section 11 and a separation or settling section 12. The reaction section 11 is conveniently of approximately the same volume as the settling section 12 but this ratio is subject to wide variation.

The reaction section 11 is divided into an entrance zone 14 and a plurality of reaction zones, three reaction zones 15, 16 and 17 being included in the reactor 10 shown but two, or more than three, may be employed as operating conditions require. The entrance zone 14 is at one end of the reactor 10 and is defined by the dished head 18 and the circular partition 19. The partition 19 has a bottom section thereof removed to provide a port 20 through which material in the zone 14 may pass for entrance into the bottom of the reaction zone 15. Reaction zone 15 is defined by the cylindrical walls of the reactor 10 and has one end closed by the partition 19 and the other end by the partition 19(a). The weir or liquid level establishing means 22 provided adjacent the partition 19(a) is circular but has a much larger section removed from its top and is arranged to form a weir which establishes the liquid level in the reaction zone 15 and thus controls the outflow of materials therefrom. If desired, a weir notch (not shown) may be formed in the top of the partition 22 for more accurate liquid level control. A rectangular plate 24 having a hole 25 therein has one end united to the bottom edge of the partition 19 and its sides united to the cylindrical wall of the reactor 10, as by welding, to provide a passageway 26 for flow of material from the bottom of the entrance zone 14 to substantially the middle region of the bottom of the reaction zone 15. A small plate 27 is united to the walls of the reactor 10 and to the end of the rectangular plate 24 to close the end of the passageway 26 so that all the material that enters the port 20 can only pass into the reaction zone 15 through the hole 25. If deemed necessary a small hole, not shown, may be drilled through the plate 27 adjacent the bottom thereof for drainage purposes, otherwise no holes or ports are provided in any of the partition members mention.

The construction of reaction zone 16 is substantially identical to that of zone 15, the corresponding parts of the zone 16 are designated by identical numerals followed by the letter (a), except in the case of partition 19 which is followed by the letter (b). The material from the reaction zone 15 overflows the top edge of the partition 22, then flows down through the downflow passageway 28, formed between the partitions 22 and 19(a) to enter the port 20(a). The reaction zone 17 is similar to the zone 15 and the corresponding parts thereof have been designated by the identical numerals followed by the letter (b). The reaction zone 17 or the final reaction zone, differs from the reaction zones 15 and 16 or preceding reaction zones primarily in that the downstream end thereof is defined by the coalescer partition 31 and the deflector plate 13 and in that it is in open communication at its top with the settling section 12.

The deflector plate 13 is united to the walls of the reactor 10 and extends from the coalescer 29, defined by partitions 31 and 32, to a level considerably above the top of the partitions 22 and 22(a) and across the top of the liquid settling zone 65 to the top of the settling section 12 on the downstream side of vapor take-off nozzle 69 so that all of the liquid material that passes from the reaction section 11 to the settling section 12 must pass through the coalescer 29 and any liquid entrained in vapors leaving reactor 10 by means of take-off nozzle 69 is returned to the settling section by nozzle 70 and conducted to the coalescer 29 wherein the separated liquid is admixed with the liquid product mixture from reaction zone 17. If desired, the deflector plate 13, shown in the drawing, can be replaced with a deflector of the type shown in copending application Serial No. 387,118, which comprises a plate extending above the partitions 22 and 22(a) to a level somewhat below the top of settling section 12. The space between the partitions 31 and 32 is filled with a suitable packing 33 such as carbon Raschig rings, or crushed siliceous rock or other suitable material which is inert to the reactants. The partition 31, which is solid, is substantially the same as and corresponds to the weir partitions 22 and 22(a) and establishes the liquid level in the reaction zone 17. The partition 32 is perforated to permit liquid flow therethrough.

Each of the reaction zones 15, 16 and 17 has a mixer or mixing zone provided therein. The mixers 35, 35(a) and 35(b) are identical in construction so that the description of one of them, the mixer 35, will suffice for all. The mixer 35 is mounted in a circular opening 36 formed in the top of the zone 15 and with its lower inlet end spaced from the plate 24 and overlying the hole 25 therein. The hole 25 is smaller than the inlet of the mixer 35 and the relative areas of the inlet of the mixer 35 and the hole 25 and the spacing of said inlet from the plate 24 are so proportioned and adjusted that all the materials supplied to the hole 25 enters said inlet while permitting entrance of desired quantities of additional material through the space between the hole 25 and said inlet. To this end also, the hole 25 may have an upwardly extending rim or lip united to its periphery (not shown).

The walls of the opening 36 are built up to form a flange of appropriate size to support the mixer 35 while in operation. The mixer 35 is suspended from an annular flange ring 38 whose outer peripheral portion rests on the face of the flange and is fastened thereto by a series of bolts. Extending downward from the flange ring 38 and fastened rigidly thereto, as for instance by a series of bolts, is a cylindrical shell 39. The shell 39 extends downwardly into the mixing zone 15 a substantial distance and is closed at its lower end by an annular tube sheet 40 which carries a series of elongated take-off tubes extending upwardly therefrom (not shown).

An impeller housing 42 is positioned beneath the tube sheet 40. The shell 39, the tube sheet 40 and the impeller housing 42 are fastened together into a unit by means of a series of studs which enter tapped holes in a flange at the lower end of the shell 39 and carry suitable nuts threaded thereon which bear against a flange formed at the periphery of the impeller housing 42.

The mixer, indicated in FIGURE 1 by numeral 35 is more fully described in FIGURES 4 and 5 of copending parent application Serial No. 387,118, now U.S. Patent No. 2,927,009. The mixer described in application Serial No. 501,292, now U.S. Patent No. 2,920,124, can be substituted for the mixer employed in FIGURE 1, if so desired, and many other modifications and changes can be made in regard to the mixer without departing from the scope of this invention. Generally, the internal structure of the mixer comprises the venturi-shaped throat of the impeller housing 42, an impeller blade, vertically elongated vanes above the impeller blade and olefin introduction means or ports above the vanes to which olefin is supplied by pipe 51. A centrally located drive shaft, enclosed by a drive shaft housing, traverses the entire mixer shell and housing and is attached at the lower end to the impeller and at the upper end is connected to driving means 58. The portion of the shell 39 extending upward from tube sheet 40 contains a plurality of elongated product take-off tubes distributed circumferentially around said drive shaft housing and extending parallel therewith.

The open upper end of each of said elongated tubes terminates a substantial distance below the flange ring 38 so that sufficient space is provided within the shell for the separation of vapor in the upper portion of the shell, withdrawing of these vapors from the mixer by means of ports 43 and reversing the direction of flow of the liquid material propelled through the tubes by the impeller. After the flow reversal just mentioned, the liquid material flows downwardly in the space between the elongated tubes, the drive shaft housing and shell 39 to exit from the series of elongated openings 53 located adjacent the lower end of the shell 39. A series of comparatively small vapor vent means 43 are provided adjacent the upper end of the shell 39 above the terminus of the elongated take-off tubes but below the flange ring, to prevent an accumulation of gas in the liquid overflowing the upper end of the elongated take-off tubes.

The settling section 12 is divided by the partition 30 into a liquid acid zone 62 and a liquid product zone 61, and zones 61 and 62 comprise the liquid settling zone 65. The settling section 12 is further divided, by deflector plate 13, into a vapor section 41 and the liquid settling zone 65, hereinabove described. The top edge of the partition 30 is at a somewhat higher level than the top edge of the opposed perforated plate 32 of the coalescer 29. The liquid reaction material as it passes through the coalescer 29 separates into acid and liquid hydrocarbon and layer separation of the two takes place in the acid zone 62. The lighter liquid hydrocarbon being the top layer, overflows partition 30 and collects in the liquid product zone 61 while the acid settles in the bottom of the acid zone 62. The liquid hydrocarbon product is removed through the pipe nozzle 63 in the bottom of the liquid product zone 61 for further processing. The acid is removed through the pipe nozzle 64 in the bottom of the liquid acid zone 62.

The zones 15, 16 and 17 are each provided with a nozzle 66 to facilitate the removal of residual material from the respective sections during cleaning, etc. The zone 14 is provided with a nozzle 67 through which the isoparaffin hydrocarbon or isoparaffin hydrocarbon in admixture with acid catalyst may be introduced into reactor 10. Zone 15 includes a nozzle 71 through which acid catalyst is supplied to the reactor 10 and mixer 35 when not supplied in admixture with insoparaffin or to supplement the volume of acid introduced in admixture with isoparaffin in nozzle 67. Zone 14 as well as zones 15 and 16 are each provided with a nozzle 68, 68(a) and 68(b) respectively. The nozzles 68, 68(a) and 68(b) may be manifolded through suitably valved lines, as shown for instance in FIGURE 2, so that vapors can be withdrawn from zones 14, 15 and 16 at controlled rates and then passed into section 12 by means of nozzle 68(c). By suitable control of the gas flow out of zones 14, 15 and 16, these zones may be maintained under any preferred pressure arrangement, however, the pressures in the zones 14, 15 and 16 should progressively diminish but all must always be higher than the pressure in zone 17 so that the pressure differential will be effective to facilitate the series flow of the reactants through the zones 14, 15, 16 and 17 and particularly so that the light reactants will flow in the acid catalyst or the emulsion phase in the succeeding zone.

The section 12 includes the nozzle 69 for conducting gas from said section, as for instance to a compressor of a refrigerating system. The section 12 furthermore includes a nozzle 70 through which may be returned to the settling section 12 any liquid material, particularly any acid, carried out by the gas stream issuing from the nozzle 69.

When employing the deflector plate shown in Serial No. 387,118, a pipe extends from the nozzle 70 to assure the return of the material to the acid section 12 and beneath the liquid level therein.

The reactor 10 may be variously modified without departing from the invention. Thus, in place of the specific type of reaction zones, reaction zones each including two or more mixing zones and a settling section, may be disposed on each side of a single product zone and all three zones included in a single vessel.

In carrying out liquid phase reactions in a plurality of reaction zones, in the presence of a liquid catalyst which is immiscible with the alkylatable hydrocarbon, as for instance in the alkylation of isoparaffin hydrocarbons in which sulfuric acid is employed as the catalyst, and in accordance with the process of the present invention, reference is had to FIGURE 2 of the drawing. Using the reactor 10 above-described, the isoparaffin hydrocarbon feed which comprises the isoparaffin hydrocarbon recycle feed and any fresh isoparaffin hydrocarbon feed required and not supplied by the alkylating hydrocarbon feed, after having the recycle acid catalyst added to it is introduced in admixture with recycle acid catalyst, hereinafter described, into the entrance zone 14 through the nozzle 67, from line 100 while the fresh acid catalyst feed is introduced into the bottom of zone 15 and beneath the hole 25 through the nozzle 71 from line 102. The isoparaffin hydrocarbon feed may comprise a single isoparaffin hydrocarbon or a mixture of such hydrocarbons or a mixture comprising one or more isoparaffin hydrocarbons and one or more normal paraffin hydrocarbons. The mole ratio of isoparaffin to total acid which enters mixer 35 is generally in the order of between about 25:1 and about 5:1, preferably between about 20:1 to about 10:1.

Alternately the zone 14 may be eliminated and the isoparaffin hydrocarbon feed as defined above and without the addition of the acid catalyst recycle, supplied directly to the inlet of the mixer 35 through the nozzle connection 71 while the recycle acid catalyst and the fresh acid catalyst after being joined are supplied to the bottom of the zone 15 through the nozzle 66. It is also possible, though not preferable, when the zone 14 is eliminated, to locate the nozzle 67 on the axis of the mixer 35 and the nozzle 71 adjacent thereto and beneath the hole 25 so that the isoparaffin and the acid catalyst enter the reactor 10 at substantially the same location at the bottom entrance to the reaction zone 15.

The alkylating hydrocarbon feed which may be a single olefin hydrocarbon, or a mixture of olefin hydrocarbons, or a mixture of one or more olefin hydrocarbons and one or more isoparaffin hydrocarbons which may also include one or more normal paraffin hydrocarbons is divided into separate parallel streams and a separate stream enters each of the mixers, in FIGURE 2, mixers 35, 35(a) and 35(b) through the respective nozzles 51, 51(a) and 51(b) from lines 104 to 110. It is to be understood, however, that a greater number of reaction zones, and thus correspondingly a greater number of mixers and streams of olefin are preferred in carrying out the process of this invention.

The isoparaffin hydrocarbon content of the alkylating hydrocarbon feed may be less than, or equal to, or more than the quantity required for alkylation reaction with all of the olefin hydrocarbon present. However, in the case of isobutane alkylation, the isobutane content of the olefin feed usually approximates that required to react with all of the olefin hydrocarbons present. Thus, the isobutane feed is largely a recycle feed and is provided in such quantity as to maintain the pre-established isobutane to olefin feed ratio, for example, in the order of 10:1 in individual reaction zones. In accordance with the present invention, isobutane to olefin ratios in the order of 8:1 for the individual reaction zones and in the order of 3:1 for the whole reactor 10 are preferred, although, at the point of contact of olefin with isobutane at least 150:1 can be obtained. Isoparaffin:olefin ratios as low as 150:1 will provide important improvements in results, but best results are obtained with ratios in the order of 400:1 and higher at the point which olefin is introduced and contacted with the isoparaffin acid emulsion. The alkylating hydrocarbon feed introduced into the nozzle 51 will flow downward through the drive shaft housing to exit out of the ports or olefin introduction means at the outlet of the impeller and vanes of mixer 35 to be admixed thereat with the acid catalyst and isohydrocarbon feed pumped by the impeller blades upwardly at maximum velocity past the point of olefin introduction. The impeller is operated at relatively high speeds in a manner to impart high velocity to the liquid presented to it so that it rapidly and intimately intermixes the acid catalyst, the isohydrocarbon, and the alkylating hydrocarbon and forms therefrom an emulsion. The emulsion is further formed or maintained by the flow thereof through the elongated product take-off tubes above the point of olefin introduction, by the rapid reverse in direction of liquid flow in the space above the outlet of these tubes and the flow through the comparatively restricted passages between the tubes, the interior of shell 39 and the exterior of the drive shaft housing before the liquid is expelled from the mixer through venting means 53.

The flow of the emulsion at high velocity and in the manner described, produces shearing effects whereby the droplets of the emulsion, which ordinarily contain the isoparaffin reactants, are continuously subdivided to present new surfaces for reaction and to present a large area of contact between the phases of the reaction mixture. The constant shearing of the droplets provides continuous presentation of fresh isoparaffin reactants at the surfaces of the droplets, which is the location at which reaction occurs.

The procedure of mixing the catalyst and reactants and reacting the isoparaffin and olefin in zone 15, is repeated in zones 16 and 17 in mixing zones 35(a) and 35(b) as the liquid emulsion passes serially therethrough. The capacity of the impellers of mixers 35, 35(a) and 35(b) is greatly in excess of that required merely to pump the acid catalyst, the isohydrocarbon and the alkylating hydrocarbon supplied through the nozzles 71 and 67 and the olefin introduction means respectively through its respective mixing section so that a rapid recirculation of the emulsion within its respective mixing section takes place and the mixers 35, 35(a) and 35(b) are positioned sufficiently above the respective plates 24, 24(a) and 24(b) to facilitate the recirculation of liquid expelled from the respective apertures 53, 53(a) and 53(b) to the impeller in admixture with liquid entering the respective mixer from hole 25, 25(a) and 25(b). The capacity of each of the mixers 35, 35(a) and 35(b) is such that material presented to each of them is recirculated from about 10 to about 40 times, preferably 15, or more times before it leaves the respective reaction zone 15, 16, or 17. The rapid recirculation of unreacted liquid material through the mixers and past the point of olefin introduction provides much shorter intervals between isoparaffin-olefin contact as compared with prior methods in which the isoparaffin is contacted with olefin only once in each particular reaction zone and in which it is necessary to circulate the entire liquid mixture to succeeding reaction zones for each contact with olefin. The longer the interval between olefin contact, the greater the formation of undesirable by-products due to hydrosulfation.

Since each impeller is arranged to recirculate the acid catalyst and the isoparaffin content of its respective mixing section many times past the olefin introduction ports through which the olefin reactants are supplied, this results in effect in multiplying the ratio of isoparaffin hydrocarbon to olefin hydrocarbon many times. Thus, if the ratio of isoparaffin hydrocarbon to olefin hydrocarbon supplied to the reactor 10 is in the order of about 4:1, the ratio for each mixing section will be about 10:1. If each impeller recirculates the content of its respective mixing chamber 15 to 40 times, as in the preferred operation of the present invention, the mentioned ratio is increased to the order of 150 to 400 to 1 and the quantity of objectionable compounds formed by the hydrosulfation is reduced to a minimum. The olefin hydrocarbons are thus immediately upon introduction into the reaction zone, subjected to optimum conditions for promoting alkylation reaction with a minimum formation of the objectionable by-products thereof.

By maintaining a proper pressure relation between the zones 14, 15, 16 and 17, the emulsion overflows the baffle 22 in zone 15 to flow downward through the passageway 28 and through the hole 25(a) and to be presented to the mixer 35(a) at a rate substantially in excess of the combined rate of acid catalyst and hydrocarbon input. The mixing and recirculation action discussed above is repeated in reaction zone 16 but with the admixture of a fresh supply of alkylation hydrocarbon or olefin, and again emulsion flows over the weir 22(a) to the hole 25(b) from passageway 28(a) and to the bottom of the reaction zone 17 at a rate substantially in excess of the combined rate of the acid catalyst and hydrocarbon input. In the reaction zone 17, the mixing and circulating action is again repeated and again with admixture of a fresh supply of alkylating hydrocarbon.

The reaction zone 17 is in open communication with the vapor section 41 and at the same pressure as the settling section 12, hence flow of material from the reaction zone 17 to the acid zone 62 does not take place because of a difference in static pressure but rather because of different pressure heads. To this end, acid catalyst and product are drawn off through nozzles 64, line 112 and nozzle 63, line 114 respectively, at such rates as to maintain the liquid level in the product zone 61 below the liquid level in the acid zone 62 and the liquid level in the acid zone 62 below the emulsion level in the reaction zone 17. If desired, the top of the deflector baffle 13 need not be attached to the top of reactor 10 but can be positioned at such a level as to prevent normal as well as accidental flow of the emulsion in the reaction zone 17 thereover as shown in copending application Serial No. 387,118. Deflector baffle 13, as arranged in the accompanying figures of this application, not only serves to prevent the emulsion in zone 17 from by-passing the coalescer 29, but also provides an efficient means for returning liquid, entrained with vapors, to the coalescer and the liquid settling zone.

The emulsion leaves the reaction zone 17 over the top of the weir partition 31 and flows through the coalescer 29 for flow into the acid settling zone 62 of the settling section 12. In flowing through the coalescer 29, the emulsion is broken down into two continuous phases. In the acid settling zone 62 the lighter hydrocarbon separates as a layer on the heavier acid catalyst to overflow the partition 30 into the product zone 61 wherefrom it is withdrawn through the nozzle 63 for further processing and refining. The acid which collects in the bottom of the section 62 is withdrawn in part for recirculation and in part for reconditioning. The acid recycled to the reactor is passed in line 112 to line 100 wherein it is mixed with incoming isoparaffin. A valved bleed-off line 116 is provided in line 112 to remove a portion of the spent acid from the system. Fresh acid is added to the system through line 102 at a sufficient rate to maintain the required catalyst activity and usually corresponds to the amount of catalyst withdrawn from the system.

The reaction described is exothermic and in order to maintain the desired temperature, or a temperature with a desired range, the zones 14, 15, 16 and 17 and section 12 must be cooled. The heat of the alkylation reaction and the heat developed in the mixing operation necessitates some means for cooling the reaction zone to maintain the reaction temperature at the desired level. Heat may be extracted from the body of liquids in the reaction zone by indirect heat exchange with an external refrigerating means. Preferably, however, internal refrigeration is effected by permitting continuous evaporation of unreacted hydrocarbons which are withdrawn from the mixing sections, condensed, cooled, and returned for further treatment. The necessary cooling effect may be obtained in various ways as by employing various devices, such as coils through which a cooling medium is circulated, etc. However, the process of the present invention preferably employs auto-refrigeration by evaporative cooling since this method possesses many unexpected advantages over other cooling methods. For example, as hereinbefore pointed out, spontaneous vaporization provides immediate cooling at the point where the reaction takes place so that the temperature of the reaction can be more closely controlled and, for optimum results, can be carried out under isothermal conditions. Thus, the isohydrocarbon feed and lower boiling hydrocarbons in the feed are vaporized in the various zones mentioned at sufficient rates at the operating pressures to provide an essentially constant predetermined temperature, i.e., when operating under preferred conditions, to maintain isothermal conditions in the reactor.

When the apparatus and process of the invention are employed in carrying out exothermic reactions in which the heat developed causes vaporization of a portion of the liquid reactants during the process, the method of introducing the alkylating hydrocarbon feed to the mixers 35, 35(a) and 35(b) is particularly advantageous. For example, in the alkylation of isoparaffin hydrocarbons with olefin hydrocarbons under conditions of temperature and pressure permitting continuous vaporization of un- reacted hydrocarbons for temperature control purposes, it is particularly advantageous to introduce the olefin reactants at the outlet or high pressure side of the impeller. In view of the relatively low concentration of olefins maintained in the reactor 10 as a whole, it is evident that the alkylation reaction, and the development of exothermic heat of reaction, are most intense at the point where the olefin reactants are admixed with the isoparaffins and the acid catalyst. The spontaneous vaporization of a portion of the mixture at that point, therefore, is relatively high. Consequently, the introduction of olefin feed through ports in the olefin introduction means into the high pressure side of the impeller has the advantage of permitting vaporization without interfering with circulation. The introduction of the fresh feed in this manner also accomplishes substantially instantaneous and complete mixing of the olefin reactants with the acid and the isoparaffins discharged from the impeller and the resulting mixture is then immediately driven through the product take-off tubes to promote further intimate and effective contact of reactants and catalyst.

As discussed above, the isoparaffin feed usually contains quantities of higher and lower boiling materials, thus, isobutane, available for charge material to an alkylation process, ordinarily occurs in mixtures which contain substantial quantities of normal butane and propane and may or may not contain minor quantities of ethane and/or methane. Inasmuch as methane, ethane and propane, together with isobutane, constitute the lowest boiling constituents in this portion of the reaction mixture, refrigeration by evaporation results in the separation from the reaction mixture of vaporized hydrocarbons comprising at least isobutane and propane and predominating in isobutane. A controlled amount of these vapors is withdrawn, by means of valved lines 118, 120 and 122 from each of their respective entrance and reaction zones 14, 15 and 16 except from the final reaction zone 17. The amount of vapor withdrawn is independently controlled by valves for each zone and is dependent upon the predetermined pressure pattern to be established and maintained in the zones. From the respective withdrawal line, the vapors are passed through line 124, into vapor section 41 of settling section 12 by means of line 126 and then into accumulator 130 by line 128. The vapors are removed from the accumulator by line 132 and passed to the refrigerative system which comprises: compressing the vapors in compressor 134, condensing the compressed vapors by indirect heat exchange in cooler 136 and transporting the condensed liquid to holding drum 138, after which a least a portion of the liquid is passed to a distillation zone or in this instance a depropanizer by means of line 140. Following distillation or depropanization, the resulting liquid stream is returned to entrance section 14 of the reactor 10 by means of recycle lines 142 and 100. The remaining liquid portion (if any) from holding drum 138 is directly recycled to entrance section 14 of the reactor by means of lines 140, 146, 142 and 100 as part of the isobutane feed thereto. Any additional isoparaffin required for the operation of the present process is introduced by means of line 147. It is to be understood, of course, that other convenient treatments of the vaporous effluent can be substituted for the treatment above-described. For example, the arrangement described in U.S. Patent 2,829,181 can be employed, if desired.

Accumulator 130 may contain a coalescer or other suitable means for separating any liquid which has been entrained with the vapors removed from section 41 and any liquid separated therein is returned, by means of line 144, to the reactor coalescing zone 29 for entry with liquid leaving reaction zone 17 and entering acid settling zone 62. If desired, any liquid carried over by the vapors can be collected and returned directly to the acid settling section below the liquid level therein by means of a conduit as in the process described in copending application Serial No. 387,118. It is also to be understood that other variations of the above technique for handling refrigerative vapors will now be apparent without departing from the scope of this invention.

The stage at which propane is eliminated in the present process is particularly advantageous because the mixture, after compressing and cooling, has a higher concentration of propane than at any other stage in the process. Sufficient propane is thus eliminated to balance the amount introduced into the system as fresh feed. The quantity of propane maintained in reaction section 11 may be regulated to provide the degree of evaporation necessary to abstract the heat of reaction at the conditions of temperature and pressure at which it is desired to conduct the reaction. In the alkylation of isobutane with butene in the presence of sulfuric acid, the lighter constituents of the isobutane recycle feed vaporize in the sections 14, 15, 16 and 17 to cool the content of the respective sections and to maintain a pre-established low temperature, most preferably about 35° F. By adjustment of the valve means in the piping through which the vapors flow out of the sections 14, 15 and 16, desired pressures may be maintained in the respective mixing sections. Thus by way of example, the valving may be set to maintain a pressure of 8 p.s.i. in the section 14, a pressure of 7 p.s.i. in the section 15, a pressure of 6 p.s.i. in the section 16, and a pressure of 5 p.s.i. in the section 17 and the settling zone 12. The diminishing pressure of the zones induces the flow of liquid from one zone to another at a high rate and obviates the difficulties associated with flooding of the reaction zones.

In FIGURE 2, the arrangements employed for preparation of the various feeds, the treatment of the acid catalyst and the treatment of the product have been omitted as such arrangements are largely conventional and known in the art. For example, Patent 2,429,205 shows feed preparation and product treatment arrangements suitable for use in connection with the carrying out of the process of the present invention.

For a specific example of the operation of the apparatus and method of the invention, reference may be had to a specific use. In the specific use, the alkylation installation described in FIGURES 1 and 2 was of such a size that it produced 1690 barrels per day of alkylate product. For this quantity of product, the olefin feed employed was 3044 barrels per day made up of:

| Hydrocarbons— | Barrels per day |
|---|---|
| Ethane | 4 |
| Propylene | 156 |
| Propane | 504 |
| Isobutane | 1135 |
| Butene | 830 |
| Normal butane | 401 |
| Pentane | 14 |

The isobutane recycle was 9198 barrels per day and made up of:

| Hydrocarbons— | Barrels per day |
|---|---|
| Ethane | 3 |
| Propane | 841 |
| Isobutane | 7485 |
| Normal butane | 852 |
| Pentane | 17 |

The fresh acid feed was 133 barrels per day; 160 barrels per day of acid were removed from the system as spent acid while 345 barrels per day of acid were removed from the reactor and recirculated by admission thereof to the isobutane recycle line so as to be admitted with the isobutane recycle into section 14. A total of 505 barrels per day of acid were withdrawn from the acid zone 62, and 5289 barrels per day of liquid product mixture were withdrawn from the product zone 61, of which 1690 barrels per day was alkylate product and 3599 barrels per day was unreacted material and contaminants.

The unreacted material was separated from the liquid mixture and returned to the system as part of the isobutane recycle.

In operating in accordance with this specific example, the temperature in the reactor was maintained at 35° F. To attain this constant temperature, the valves in the vapor lines 118, 120 and 122 from zones 14, 15 and 16 were adjusted to maintain a pressure in the section 14 of 8 p.s.i. differential, in the section 15 of 7 p.s.i., in the section 16 of 6 p.s.i., and in section 17 and the settling section of 5 p.s.i. To handle the refrigeration load, 6553 barrels of liquid per day were evaporated and removed from the settling section 12. The 6553 barrels per day of condensed vapors were composed of:

| Hydrocarbons— | Barrels per day |
|---|---|
| Ethane | 7 |
| Propane | 1105 |
| Isobutane | 4740 |
| Normal butane | 672 |
| Pentane | 17 |

The mixers 35, 35(a) and 35(b) were operated at such speed that the flow therethrough past the olefin feed inlet was such as to multiply the isobutane to olefin ratio approximately twenty-five times so that the apparent isobutane to olefin ratio was increased to the order of about 200:1 at the point of contact. The time interval between olefin contact with a given portion of emulsion was reduced to 20 seconds as compared with an interval of about 5 minutes when recirculation within the zone is not employed.

The superior results obtained by the use of the novel process of this invention is apparent from a consideration of the following comparative data, column 1 being data derived from conventional practice, wherein the pressure between reaction zones not controlled and the liquid reaction mixture is not recirculated through a mixing device, while column 2 being data derived from practice in accordance with the present invention wherein a pressure drop of at least 1 p.s.i. is maintained between the reaction zones and the liquid reaction mixture is recirculated through a mixing device as hereinbefore described.

| | 1 | 2 |
|---|---|---|
| Production (Barrels/Stream Day) | 1,211 | 1,201 |
| Space Velocity (Volume of Acid/Volume of Olefins/Hr.) | 0.30 | 0.302 |
| Isobutane in Reactor Effluent (liquid volume percent) | 51.3 | 53.1 |
| External Isobutane to Olefin Ratio per Mixing Section | 9.0 | 9.25 |
| Internal Isobutane to Olefin Ratio at 2:1 Acid to Hydrocarbon Ratio | 149 | 159 |
| Residence time of Reactants in Reaction Section of Reactor (hours) | 0.6 | 0.4 |
| Pounds Acid Consumed/gal. Alkylate Produced | 1.89 | 1.35 |
| Spent Acid Strength Wt. Percent | 94.4 | 95.2 |
| Rerun Yield of 338° F. End Point Alkyate (Light Alkylate) | 85.7 | 91.2 |
| Octane Number: | | |
| F–1 Clear—{Total Alkylate | | 92.8 |
| {Light Alkylate | 93.2 | 93.6 |
| F–2 Clear—{Total Alkylate | | 91.3 |
| {Light Alkylate | | 91.3 |
| Octane Rating Performance Number: | | |
| F–3+4.6 cc. TEL Light Alkylate | 119 | |
| F–4+4.6 cc. TEL Light Alkylate | 147 | |

In the above, F–1 is equivalent to Research Octane Knock Rating; F–2 is equivalent to ASTM Motor Octane Knock Rating; F–3 is equivalent to Lean Mixture Method Knock Rating for aviation gasolines; and F–4 is equivalent to Rich Mixture Method Knock Ratings for aviation gasolines.

The above data shows that by the present process, acid consumption is greatly reduced and hydrosulfation is reduced to a minimum as a result of preventing all of the liquid material leaving one reaction zone to emulsify and contact with olefin, a more favorable molar excess of isobutane is obtainable without increasing the volume of isobutane feed and that these advantages result in a greatly increased yield of light alkylate product, which product is of improved quality as indicated by octane number.

Since many changes may be made without departing from the scope of the invention herein involved, it is intended that all matter contained in the above description or shown in the accompanying drawings shall be interpreted as illustrative and not limiting to the scope thereof.

Having thus described our invention we claim:

1. In an alkylation reaction wherein an alkylatable hydrocarbon is reacted with an alkylating agent in the presence of an immiscible liquid catalyst in a series of confined mixing zones each contained in a confined reaction zone, and wherein the alkylatable hydrocarbon and the catalyst are progressively passed in series flow through each of the reaction zones and their respective mixing zones, the process which comprises: passing the alkylatable hydrocarbon and the liquid catalyst to the lower portion of a first reaction zone and to a confined space directly below an area of high upward vertical velocity; emulsifying the alkylatable hydrocarbon and the liquid catalyst; passing the emulsion upwardly at maximum velocity within a first confined mixing zone past a point where the alkylating agent is continuously being introduced, under conditions such that the condensation reaction between the alkylatable hydrocarbon and alkylating agent takes place in the liquid phase and spontaneous vaporization occurs; passing the resulting mixture upwardly through a semiquiescent zone to separate therefrom vaporous material; accumulating in and venting vapors from the upper portion of said first mixing zone; reversing the flow of the liquid mixture in a downwardly direction within said first mixing zone, and expelling the liquid mixture from a lower portion of the first confined mixing zone; recirculating a portion of the expelled liquid to said area of high upward vertical velocity in admixture with the incoming alkylatable hydrocarbon and catalyst; recirculating the expelled liquid through the first confined mixing zone for recontact with the alkylating agent; allowing the liquid level in said first reaction zone to rise to a predetermined level above the point where liquid is expelled from the confined mixing zone; transferring liquid above said liquid level in said first reaction zone through a confined passageway and thence to a second confined space directly below an area of high upward vertical velocity in a second confined reaction zone containing a second confined mixing zone; repeating the above flow and transfer of liquid in each of the succeeding zones and separately withdrawing a controlled amount of vapors from each of the confined reaction zones to regulate the pressure therein so that the pressure progressively decreases in the direction of liquid flow through the reaction zones to induce the flow of liquid through said zones.

2. In an alkylation reaction wherein an alkylatable hydrocarbon is reacted with an olefin in the presence of an acid catalyst, the method which comprises: introducing an alkylatable hydrocarbon and an acid catalyst into a multi-stage reactor containing a plurality of confined reaction zones; passing the alkylatable hydrocarbon-acid mixture to the bottom of a first reaction zone through a confined passageway at a point directly below an area of highest upward vertical velocity; emulsifying the alkylatable hydrocarbon-acid mixture; passing the emulsion upwardly at a maximum velocity in a confined mixing zone, within the confined reaction zone, past a point of olefin introduction under conditions such that the alkylation reaction takes place in the liquid phase and spontaneous vaporization occurs; separating the vapors from the liquid to provide a body of liquid with a superimposed body of vapor in the reaction zone; inducing at least a portion of the liquid thus obtained from said mixing zone to flow to a second reaction zone in a second confined passageway and preventing the carryover of vapor to the next succeeding reaction zone; repeating the above procedure in the second confined reaction zone and separately withdrawing a controlled amount of vapors from each of the reaction zones to regulate the pressure therein so that the pressure in the first zone is maintained at a higher pressure than the second zone to induce the flow of liquid from said first zone to the second zone in series at a high circulation rate.

3. In an alkylation reaction wherein an alkylatable hydrocarbon is reacted with an olefin in the presence of an acid catalyst, the method which comprises; introducing an alkylatable hydrocarbon and an acid catalyst into a multi-stage reactor containing a plurality of confined reaction zones; passing the alkylatable hydrocarbon-acid mixture to the bottom of a first reaction zone through a confined passageway at a point directly below an area of highest upward vertical velocity; emulsifying the alkylatable hydrocarbon-acid mixture; passing the emulsion upwardly at a maximum velocity in a confined mixing zone, within the confined reaction zone, past a point of olefin introduction under conditions such that the alkylation reaction takes place in the liquid phase and spontaneous vaporizaion occurs; separating the vapors from the liquid to provide a body of liquid with a superimposed body of vapor in the upper portion of the mixing zone and in the reaction zone; passing at least a portion of the liquid thus obtained from said mixing zone into said reaction zone; inducing the liquid from said reaction zone after reaching a predetermined, relatively higher liquid level than that at which liquid is expelled from said mixing zone to flow to the bottom of a second reaction zone containing a confined mixing zone in a confined passageway and preventing the carryover of vapor to the next succeeding reaction zone; repeating the above procedure in the second confined reaction zone; and separately withdrawing a controlled amount of vapors from each of the reaction zones to regulate the pressure therein so that the pressure in the first zone is maintained at a higher pressure than the second zone to induce the flow of liquid of relatively low density from said first zone into liquid of relatively high density in the second zone in series at a high circulation rate.

4. In an alkylation reaction wherein an alkylatable hydrocarbon is reacted with an olefin in the presence of an acid catalyst, the method which comprises: introducing an alkylatable hydrocarbon and an acid catalyst into a multi-stage reactor containing a plurality of confined reaction zones; passing the alkylatable hydrocarbon-acid mixture to the bottom of a first reaction zone through a confined passageway at a point directly below an area of highest upward vertical velocity; emulsifying the alkylatable hydrocarbon-acid mixture; passing the emulsion upwardly at a maximum velocity in a confined mixing zone, within the confined reaction zone, past a point of olefin introduction under conditions such that the alkylation reaction takes place in the liquid phase and spontaneous vaporization occurs; separating the vapors from the liquid to provide a body of liquid with a superimposed body of vapor in the upper portion of the mixing zone and the reaction zone; permitting the liquid in the reaction zone to reach a predetermined level and to assume a minimum density in the upper portion of the liquid level; passing at least a portion of the liquid from the mixing zone into said reaction zone at a point below said liquid level; which liquid is of maximum density due to emulsification with acid; recirculating, at a high velocity, a portion of the liquid thus expelled to the area of highest upward vertical velocity and through said mixing zone for recontact with olefin; repeating the recirculation of liquid through the mixing zone at least 10 times before permitting said liquid to leave said reaction zone; inducing the liquid above said predetermined level to flow from said reaction zone to the bottom portion of a second reaction zone containing a confined mixing zone in a second confined passageway and preventing the carryover of vapor to the next succeeding reaction zone;

repeating the above procedure in the second confined reaction zone; and separately withdrawing a controlled amount of vapors from each of the reaction zones to regulate the pressure therein so that the pressure in the first zone is maintained at a higher pressure than the second zone and so that the liquid of relatively low density in the second confined passageway from said first zone is induced to flow into liquid of relatively high density in the second zone in series at a high circulation rate.

5. The process of claim 4 wherein the alkylatable hydrocarbon comprises an isoparaffin.

6. In an alkylation reaction wherein an alkylatable hydrocarbon is reacted with an olefin in the presence of an acid catalyst, the method which comprises: introducing an alkylatable hydrocarbon and an acid catalyst into a multi-stage reactor containing a plurality of confined reaction zones; passing the alkylatable hydrocarbon-acid mixture to the bottom of a first reaction zone through a confined passageway at a point directly below an area of highest upward vertical velocity; emulsifying the alkylatable hydrocarbon-acid mixture; passing the emulsion upwardly at a maximum velocity in a confined mixing zone, within the confined reaction zone, past a point of olefin introduction under conditions such that the alkylation reaction takes place in the liquid phase and spontaneous vaporization occurs; separating the vapors from the liquid to provide a body of liquid with a superimposed body of vapor in the upper portion of the mixing zone and the reaction zone; permitting the liquid in the reaction zone to reach a predetermined level and to assume a minimum density in the upper portion of the liquid level; passing at least a portion of the liquid in the mixing zone into said reaction zone, which liquid is of maximum density due to emulsification with acid; recirculating, at a high velocity, a portion of the liquid thus expelled to the area of highest upward vertical velocity and through said mixing zone for recontact with olefin; repeating the recirculation of liquid through the mixing zone between 15 and 40 times before permitting said liquid to leave said reaction zone; inducing the liquid to flow from said reaction zone after reaching said predetermined level to the bottom portion of the next succeeding reaction zone, containing a confined mixing zone, in a second confined passageway and preventing the carryover of vapor to the next succeeding reaction zone; repeating the above procedure in each of the succeeding confined reaction zones; and separately withdrawing a controlled amount of vapors from each of the reaction zones to regulate the pressure therein so that the pressure in the first zone is maintained between about 0.5 p.s.i. and about 10 p.s.i. higher than the second zone to induce the flow of liquid from said first zone through the second zone in series.

7. The process of claim 5 wherein the pressure in the first zone is maintained between about 1 p.s.i. and about 3 p.s.i. higher than the second zone.

8. The process of claim 5 wherein the alkylatable hydrocarbon comprises an isobutane.

9. The process of claim 5 wherein the olefin comprises butene.

10. The process of claim 5 wherein the acid catalyst is sulfuric acid.

11. The process of claim 5 wherein the liquid mixture, after leaving the last reaction zone in the series, is passed to a coalescing zone and thence into a settling zone for removal of catalyst from the liquid product mixture.

12. In an alkylation reaction wherein an alkylatable hydrocarbon is reacted with an alkylating agent in the presence of an immiscible liquid catalyst in a confined mixing zone contained in a confined reaction zone the process which comprises: passing the alkylatable hydrocarbon and the liquid catalyst to the lower portion of the reaction zone and to a confined space directly below an area of highest upward vertical velocity, emulsifying the alkylatable hydrocarbon and the liquid catalyst, passing the emulsion upwardly at maximum velocity within the confined mixing zone past a point where the alkylating agent is continuously being introduced, under conditions such that the condensation reaction between the alkylatable hydrocarbon and the alkylating agent takes place in the liquid phase and spontaneous vaporization occurs, passing the resulting mixture in the mixing zone upwardly through a semiquiescent zone to separate therefrom any vaporous material, reversing the flow of the liquid mixture in a downwardly direction within said mixing zone and expelling the liquid mixture from the confined mixing zone, recirculating a portion of the expelled liquid to said area of highest upward vertical velocity in admixture with the incoming alkylatable hydrocarbon and catalyst and recirculating the expelled liquid through the confined mixing zone for recontact with the alkylating agent.

13. In an alkylation reaction wherein an alkylatable hydrocarbon is reacted with an olefin in the presence of an immiscible liquid catalyst in a confined mixing zone contained within a confined reaction zone and wherein the sensible heat of reaction is withdrawn from said mixing zone and said reaction zone by vaporizing a portion of the reaction mixture during contact, the process which comprises: passing the alkylatable hydrocarbon and the liquid catalyst to the lower portion of said reaction zone and to a confined space directly below an area of highest upward vertical velocity provided by said mixing zone; emulsifying the alkylatable hydrocarbon and catalyst; passing the emulsion upwardly at a maximum velocity in the confined mixing zone past a point of olefin introduction under conditions such that the condensation reaction takes place in the liquid phase; passing the liquid reaction mixture upwardly through a semiquiescent zone to separate therefrom vaporous material; reversing the flow of the liquid mixture in a downwardly direction within said mixing zone and expelling the liquid mixture from the confined mixing zone; recirculating a portion of the expelled liquid to said area of highest upward velocity in admixture with incoming alkylatable hydrocarbon and catalyst; recirculating the expelled liquid mixture through the confined mixing zone at high velocity for recontact with olefin reactant; repeating the recirculation of the expelled liquid mixture at least 10 times at high velocity to provide a mole ratio of isoparaffin to olefin at the point of contact of at least 150:1 without altering the volume of alkylatable hydrocarbon introduced to the reaction zone.

14. In an alkylation reaction wherein an alkylatable hydrocarbon is reacted with an olefin in the presence of an immiscible liquid catalyst in a confined mixing zone contained within a confined reaction zone and wherein the alkylatable hydrocarbon is introduced into the reaction zone in a mole ratio of between about 2:1 and about 20:1 alkylatable hydrocarbon to olefin, and wherein the sensible heat of reaction is withdrawn from said mixing zone and said reaction zone by vaporizing a portion of the reaction mixture during contact, the process which comprises: passing the alkylatable hydrocarbon and the liquid catalyst to the lower portion of said reaction zone and to a confined space directly below an area of highest upward vertical velocity provided by said mixing zone; emulsifying the alkylatable hydrocarbon and catalyst; passing the emulsion upwardly at a maximum velocity in the confined mixing zone past a point of olefin introduction under conditions such that the liquid phase condensation reaction takes place; passing the liquid reaction mixture upwardly through a semiquiescent zone to separate therefrom vaporous material; reversing the flow of the liquid mixture in a downwardly direction within said mixing zone and expelling the liquid mixture from the confined mixing zone; recirculating a portion of the expelled liquid to said area of highest upward velocity in admixture with incoming alkylatable hydrocarbon and catalyst; recirculating the expelled liquid mixture through the confined mixing zone at high velocity for recontact with olefin reactant; repeating the recirculation of the expelled liquid mixture at least 10 times at high velocity to provide a mole ratio of isoparaffin to olefin at the point of contact of at least 150:1 without increasing the volume of alkylatable hydrocarbon introduced to the reaction zone.

15. In the alkylation of an alkylatable hydrocarbon with an olefin in the presence of a liquid acid catalyst, the steps comprising introducing said alkylatable hydrocarbon and said liquid acid catalyst into a first reaction zone, intimately mixing said catalyst and alkylatable hydrocarbon in said reaction zone to produce a body of alkylatable hydrocarbon-acid emulsion, introducing olefins into said emulsion to effect reaction of said olefins with alkylatable hydrocarbon contained therein, flowing a portion of said body of emulsion contained in said first reaction zone in a confined stream into a second reaction zone at a low point therein, intimately mixing said emulsion in said second reaction zone to maintain therein an alkylatable hydrocarbon-acid emulsion, introducing additional olefins into said second reaction zone to effect reaction thereof with alkylatable hydrocarbon contained therein, maintaining over the body of emulsion in each of said reaction zones a separate confined vapor phase comprising hydrocarbon vapors evolved from the emulsion by the heat of reaction, separately withdrawing vapors from each of said vapor phases, and maintaining a higher pressure on the vapor phase over the emulsion contained in said first reaction zone than the pressure maintained on the vapor phase over the emulsion contained in the second reaction zone to produce a regulated flow of said emulsion in said confined stream from said first reaction zone to said second reaction zone.

16. In the alkylation of isoparaffin hydrocarbons with olefins in the presence of a liquid acid catalyst, the steps comprising introducing said isoparaffin hydrocarbons and said liquid acid catalyst into a first reaction zone, intimately mixing said catalyst and hydrocarbons in said reaction zone to produce a body of hydrocarbon-acid emulsion, introducing olefin into said emulsion to effect reaction of said olefin with isoparaffin hydrocarbons contained therein, flowing a portion of said body of emulsion contained in said first reaction zone in a confined stream into a second reaction zone at a low point therein, intimately mixing said emulsion in said second reaction zone to maintain therein a hydrocarbon-acid emulsion, introducing additional olefin into said second reaction zone to effect reaction thereof with isoparaffin hydrocarbons contained therein, maintaining over the body of emulsion in each of said reaction zones a separate confined vapor phase comprising hydrocarbon vapors evolved from the emulsion by the heat of reaction, separately withdrawing vapors from each of said vapor phases and maintaining a higher pressure on the vapor phase over the emulsion contained in said first reaction zone than the pressure maintained on the vapor phase over the emulsion contained in the second reaction zone to produce a regulated flow of said emulsion in said confined stream from said first reaction zone to said second reaction zone.

17. In an alkylation reaction wherein an alkylatable hydrocarbon is reacted with an olefin in the presence of an acid catalyst, and wherein the alkylatable hydrocarbon and acid catalyst are emulsified and passed for series flow through a multi-stage reactor containing a plurality of confined reaction zones with separate olefin introduction into each of said zones for contact with the emulsion, the improved process for transferring a liquid mixture comprising alkylatable hydrocarbon and acid catalyst at a relatively low density from one reaction zone into a succeeding reaction zone containing liquid of relatively high density at the point of entrance into said succeeding zone which comprises: maintaining a pressure differential between the respective zones decreasing in the direction of liquid flow, said pressure differential between any given pair of zones being determined by the formula $$P_1 = P_2 + \frac{(d_e(h_e) - d_f(h_f))}{2.31} + F$$

wherein $P_1$ in p.s.i. is the pressure in one reaction zone; $P_2$ is the pressure (p.s.i.) in the next succeeding reaction zone; $d_e$ is the average specific gravity of the liquid in zone $P_2$; $h_e$ is the liquid level, in feet, of the liquid in zone $P_2$; $d_f$ is the specific gravity of the liquid of relatively low density flowing from zone $P_1$ to zone $P_2$; $h_f$ is the liquid level, in feet, of the liquid being transported to zone $P_2$ and F is the frictional loss during transportation expressed in pounds per square inch.

18. The process of claim 17 wherein the alkylatable hydrocarbon comprises an isoparaffin.

19. In an alkylation reaction wherein an alkylatable hydrocarbon is reacted with an olefin in the presence of an acid catalyst, wherein the alkylatable hydrocarbon and acid catalyst are emulsified and passed for series flow through a multi-stage reactor containing a plurality of confined reaction zones with separate olefin introduction into each of said zone for contact with the emulsion, and wherein the temperature of the reaction is controlled by allowing a portion of the reaction mixture to vaporize in each reaction zone, the improved process for transferring a liquid mixture comprising alkylatable hydrocarbon and acid catalyst at a low density from one reaction zone into a succeeding reaction zone containing liquid of relatively high density at the point of entrance into said succeeding zone which comprises: maintaining a pressure differential between the respective zones decreasing in the direction of liquid flow, said pressure differential between any given pair of zones being determined by the formula $$P_1 = P_2 + \frac{(d_e(h_e) - d_f(h_f))}{2.31} + F$$

wherein $P_1$ is the pressure (p.s.i.) in one reaction zone; $P_2$ is the pressure (p.s.i.) in the next succeeding reaction zone; $d_e$ is the average specific gravity of the liquid in zone $P_2$; $h_e$ is the liquid level in feet of the liquid in zone $P_2$; $d_f$ is the specific gravity of the liquid of relatively low density flowing from zone $P_1$ to zone $P_2$; $h_f$ is the liquid level in feet of the liquid being transported to zone $P_2$ and F is the frictional loss during transportation expressed in pounds per square inch, said pressure differential being maintained by separate withdrawal of a controlled amount of vapors from each of the zones in the multi-zone reactor.

20. The process of claim 18 wherein the alkylatable hydrocarbon comprises an isoparaffin.

21. The process of claim 20 wherein the isoparaffin comprises isobutane and the olefin comprises butene.

22. The process of claim 18 wherein the acid catalyst comprises sulfuric acid.

23. A method for effecting the exothermic alkylation of an iosparaffin hydrocarbon in the presence of a liquid acid catalyst which comprises: maintaining a body of liquid comprising amixture of isoparaffin and acid catalyst within a reactor containing a plurality of confined reaction zones; circulating said mixture in each of said zones upwardly through and downwardly around a path of restricted cross-sectional area between a point adjacent the lower boundary of the liquid body and a point near the upper boundary thereof; introducing an alkylating agent into the liquid mixture at a point of such high upward vertical flow velocity that the isoparaffin and acid are emulsified; allowing the exothermic alkylation reaction to take place while simultaneously vaporizing a portion of the liquid mixture to control the temperature of the exothermic reaction; maintaining a body of vapor above the body of liquid which body of vapor is confined in the reaction zone in which it is formed; withdrawing the liquid mixture at a point adjacent its upper boundary and transferring said liquid through a confined passageway and into the bottom portion of the next succeeding reaction zone; repeating the above procedure in each of the reaction zones within the reactor; passing the liquid mixture containing alkylate product from the final reaction zone to a separation zone and separating alkylate from the liquid mixture.

24. The process of claim 23 wherein the catalyst comprises sulfuric acid.

25. The process of claim 23 wherein the isoparaffin comprises isobutane.

26. The process of claim 23 wherein the olefin comprises butene.

27. The processes of claim 23 wherein the liquid mixture after introduction of olefin is passed upwardly in a plurality of elongated quiescent zones and then passed downwardly outside of said elongated passageways.

28. The process of claim 23 wherein the circulation of liquid upwardly and downwardly in each of said reaction zones is induced by a mixing zone adjacent the lower boundary of the liquid body.

29. The process of claim 23 wherein the liquid in one reaction zone is induced to flow into the next succeeding reaction zone by maintaining a pressure drop of at least 1 p.s.i.g. between the zones, the pressure decreasing in the direction of liquid flow.

30. A method for effecting the exothermic alkylation of an isoparaffin hydrocarbon in the presence of a liquid acid catalyst which comprises: maintaining a body of liquid comprising a mixture of isoparaffin and acid catalyst within a reactor containing a plurality of confined reaction zones; circulating said mixture in each of said zones upwardly and downwardly around a path of restricted cross-sectional area between a point adjacent the lower boundary of the liquid body; introducing an alkylating agent into the liquid mixture at a point of such high upward vertical flow velocity that the isoparaffin and the acid are emulsified; allowing the exothermic alklation reaction to take place in the liquid phase while simultaneously vaporizing a portion of the liquid mixture to control the temperature of the exothermic reaction and to provide isothermal conditions throughout the reaction zone; maintaining a body of vapor above the body of liquid, which body of vapor is confined in the reaction zone in which it is formed; withdrawing the liquid mixture at a point adjacent its upper boundary and transferring said liquid through a confined passageway into the bottom portion of the next succeeding reaction zone; and repeating the above procedure in each of the reaction zones within the reactor.

31. In an exothermic condensation reaction wherein a first liquid component is reacted with a second liquid component in the presence of an immiscible liquid catalyst, the steps comprising: introducing said first liquid component and said liquid catalyst into a first reaction zone, intimately mixing said catalyst and alkylatable hydrocarbon in said reaction zone to produce an emulsified liquid body; introducing said second liquid component into said emulsion to effect the reaction of said first and second liquid components in the liquid phase; flowing a portion of the resulting liquid body contained in said first reaction zone, in a confined stream, into a second reaction zone at a low point therein, intimately mixing said liquid to maintain an emulsion in said second reaction zone; introducing additional second liquid component into said second reaction zone to effect reaction thereof with said emulsion; maintaining over the body of liquid in each of said reaction zones, a separate confined vapor phase comprising vapors evolved from the liquid by the heat of reaction; separately withdrawing a controlled amount of vapors from each of said vapor phases; and maintaining a higher pressure on the vapor phase over the liquid body contained in said first reaction zone than the pressure maintained on the vapor phase over the liquid body contained in said second reaction zone to produce a regulated flow of said liquid, in said confined stream, from said first recation zone to said second reaction zone.

References Cited in the file of this patent

UNITED STATES PATENTS

| | | |
|---|---|---|
| 2,238,802 | Altshuler et al. | Apr. 15, 1941 |
| 2,244,556 | Holm | June 3, 1941 |
| 2,366,627 | Kemp | Jan. 2, 1945 |
| 2,429,205 | Jenny et al. | Oct. 21, 1947 |
| 2,474,924 | Watson et al. | July 5, 1949 |
| 2,768,987 | Hart | Oct. 30, 1956 |
| 2,920,124 | Stiles et al. | Jan. 5, 1960 |
| 2,927,009 | Stiles et al. | Mar. 1, 1960 |

FOREIGN PATENTS

| | | |
|---|---|---|
| 763,314 | Great Britain | Dec. 12, 1956 |

UNITED STATES PATENT OFFICE
CERTIFICATE OF CORRECTION

Patent No. 3,160,673            December 8, 1964

John M. Black et al.

It is hereby certified that error appears in the above numbered patent requiring correction and that the said Letters Patent should read as corrected below.

In the grant, lines 3 and 4, and in the heading to the printed specification, lines 5 and 6, for "assignors, by mesne assignments, to Pullman Incorporated, a corporation of Delaware", each occurrence, read -- assignors to Pullman Incorporated, a corporation of Delaware --.

Signed and sealed this 7th day of June 1966.

(SEAL)
Attest:

ERNEST W. SWIDER            EDWARD J. BRENNER
Attesting Officer            Commissioner of Patents